US012709871B2

(12) United States Patent
Kurokami et al.

(10) Patent No.: US 12,709,871 B2
(45) Date of Patent: Aug. 18, 2026

(54) WORK SUPPORT SYSTEM

(71) Applicant: HITACHI CONSTRUCTION MACHINERY CO., LTD., Tokyo (JP)

(72) Inventors: Kazushige Kurokami, Abiko (JP); Hiroshi Sakamoto, Kashiwa (JP); Shigeki Tokita, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 28 days.

(21) Appl. No.: 18/846,296

(22) PCT Filed: Mar. 3, 2023

(86) PCT No.: PCT/JP2023/008148
§ 371 (c)(1),
(2) Date: Sep. 12, 2024

(87) PCT Pub. No.: WO2023/189216
PCT Pub. Date: Oct. 5, 2023

(65) Prior Publication Data

US 2025/0198128 A1 Jun. 19, 2025

(30) Foreign Application Priority Data

Mar. 31, 2022 (JP) ................................ 2022-060752

(51) Int. Cl.
*G06V 10/75* (2022.01)
*E02F 9/20* (2006.01)
(Continued)

(52) U.S. Cl.
CPC .............. *E02F 9/261* (2013.01); *G06V 10/25* (2022.01); *G06V 10/751* (2022.01);
(Continued)

(58) Field of Classification Search
CPC . E02F 9/261; E02F 9/2033; E02F 3/43; E02F 3/435; E02F 9/20; E02F 9/205;
(Continued)

(56) References Cited

U.S. PATENT DOCUMENTS

2017/0254050 A1 9/2017 Wright
2017/0255895 A1 9/2017 Kozumi et al.
(Continued)

FOREIGN PATENT DOCUMENTS

JP 2011-052383 A 3/2011
JP 2013-151830 A 8/2013
(Continued)

OTHER PUBLICATIONS

International Preliminary Report on Patentability received in corresponding International Application No. PCT/JP2023/008148 dated Oct. 10, 2024.
(Continued)

*Primary Examiner* — Russell Frejd
*Assistant Examiner* — Chanmin Park
(74) *Attorney, Agent, or Firm* — MATTINGLY & MALUR, PC

(57) ABSTRACT

In the work support system equipped with a front work device provided on a hydraulic excavator, an angle sensor that detects the posture information of the front work device, and a controller that provides work support for the hydraulic excavator based on a predetermined and stored work area, a camera, and a touch display capable of specifying any position within the image captured by the camera, the controller configured to extract the image area occupied by the hydraulic excavator from the image captured by the camera and based on the number of pixels in the longitudinal direction of the hydraulic excavator in the extracted image area, the posture information of the hydraulic excavator, and
(Continued)

the actual dimensions of the hydraulic excavator, convert the position specified in the image by the touch display into the coordinate values of real space coordinates, and set the work area.

4 Claims, 14 Drawing Sheets

(51) Int. Cl.
*E02F 9/26* (2006.01)
*G06V 10/25* (2022.01)
*G06V 10/772* (2022.01)
*H04N 23/60* (2023.01)

(52) U.S. Cl.
CPC .......... *G06V 10/772* (2022.01); *E02F 9/2033* (2013.01); *H04N 23/64* (2023.01)

(58) Field of Classification Search
CPC ... E02F 9/26; E02F 9/262; E02F 9/264; E02F 9/265; E02F 9/24; G06V 10/25; G06V 10/751; G06V 10/772; G06V 20/17; G06V 2201/06; G06V 10/764; G06V 10/774; G06V 20/60; G06V 20/56; H04N 23/64; H04N 7/18; G06T 2207/20081; G06T 7/73; G06T 7/11; B60Y 2200/412
See application file for complete search history.

(56) References Cited

U.S. PATENT DOCUMENTS

2019/0028676 A1 1/2019 Koga et al.
2020/0370282 A1 11/2020 Nishi et al.
2021/0156121 A1* 5/2021 Hayakawa ................ G06T 7/70
2021/0230840 A1 7/2021 Shinato et al.
2022/0222392 A1 7/2022 Ishihara et al.
2022/0251806 A1 8/2022 Otoh

FOREIGN PATENT DOCUMENTS

JP 2016-089388 A 5/2016
JP 2020-200597 A 12/2020
WO 2016125915 A1 8/2016
WO 2017170651 A1 10/2017
WO 2020044510 A1 3/2020
WO 2020080501 A1 4/2020
WO 2021085608 A1 5/2021
WO 2022-000570 A1 1/2022

OTHER PUBLICATIONS

International Search Report PCT/JP2023/008148 dated Apr. 4, 2023.

* cited by examiner

WORK SUPPORT SYSTEM

TECHNICAL FIELD

The present invention relates to a work support system.

BACKGROUND ART

As a technology for improving work efficiency by setting a predetermined work area in work machines such as hydraulic excavators and providing work support based on that work area, for example, those described in Patent Literature 1 and 2 are known.

Patent Literature 1 discloses a swing control device for work machines, comprising a swing operation lever that sets the swing speed of the upper swing body relative to the lower traveling body of the work machine, an electric motor that drives the upper swing body to swing relative to the lower traveling body by rotating a rotor relative to a stator, which the motor has, a rotational speed detection means provided on the electric motor to detect the angular velocity of the rotor relative to the stator as motor angular velocity, an electric motor control means to control the rotation speed of the electric motor so that the motor angular velocity detected by the rotational speed detection means corresponds to the swing speed set by the swing operation lever, a swing angle calculation means to calculate the swing angle of the upper swing body relative to the lower traveling body based on the time integral of the motor angular velocity detected by the rotational speed detection means, a swing range setting means to set the swing range of the upper swing body relative to the lower traveling body, and a stop control means to stop the operation of the electric motor by the electric motor control means when the swing angle exceeds the swing range set by the swing range setting means.

Patent Literature 2 discloses an operation assistance device for assisting the operation of work machines, equipped with an operation control section that controls the movement of the work machine according to the information represented by marker images corresponding to markers in the work site captured by an imaging device mounted on the work machine.

CITATION LIST

Patent Literature

Patent Literature 1: JP 2011-52383 A
Patent Literature 2: JP 2013-151830 A

SUMMARY OF INVENTION

Technical Problem

However, in the conventional technology described in Patent Literature 1, to input a predetermined threshold, the operator needs to quantitatively grasp the angle to the swing stop position, making it difficult to set the swing range as intended. Moreover, even when setting the swing stop position by moving the upper swing body, part of the work machine may become an obstruction, making accurate positioning difficult. Particularly in hydraulic excavators, when attempting to set the work area such as work height or work radius based on the machine's current position, the blind spots caused by the cab's ceiling or the bucket are significant, raising concerns that the work area may be set to an unintended position.

Moreover, in the conventional technology described in Patent Literature 2, a fixed marker is installed at the work site, and an off-limits area is set based on the information indicated by the marker, with the area being determined using markers installed around it, thus setting a work area suitable for the site's environment. However, if the work area changes or if there is movement between work sites, it is necessary to relocate the markers each time, which raises concerns about reduced work efficiency.

The present invention has been made in view of the above and aims to provide a work support system that allows intuitive and easy setting of the intended work area.

Solution to Problem

The present invention includes a plurality of means for solving the above problem, and an example thereof is a work support system comprising a work device provided on a work machine, a posture detection device that detects the posture information of the work device, and a controller that provides work support for the work machine based on a predetermined and stored work area, an imaging device capable of imaging the appearance of the work machine at the work site, and an input device capable of specifying any position within the image captured by the imaging device, wherein the controller configured to extract the image area occupied by the work machine from the image captured by the imaging device, convert the position within the image specified by the input device into real space coordinates based on the number of pixels in the longitudinal direction of the work machine in the extracted image area, the posture information of the work machine, and the actual dimensions of the work machine, and set the work area such that the position of the converted coordinate values becomes the endpoint.

Advantageous Effects of Invention

According to the present invention, it is possible to provide a work support system that allows intuitive and easy setting of the intended work area.

DESCRIPTION OF EMBODIMENTS

Hereinafter, an embodiment of the present invention will be described with reference to FIGS. 1 to 15. In this embodiment, a hydraulic excavator equipped with a front work device is described as an example of the work machine, but the present invention can also be applied to other work machines.

Figure 1:
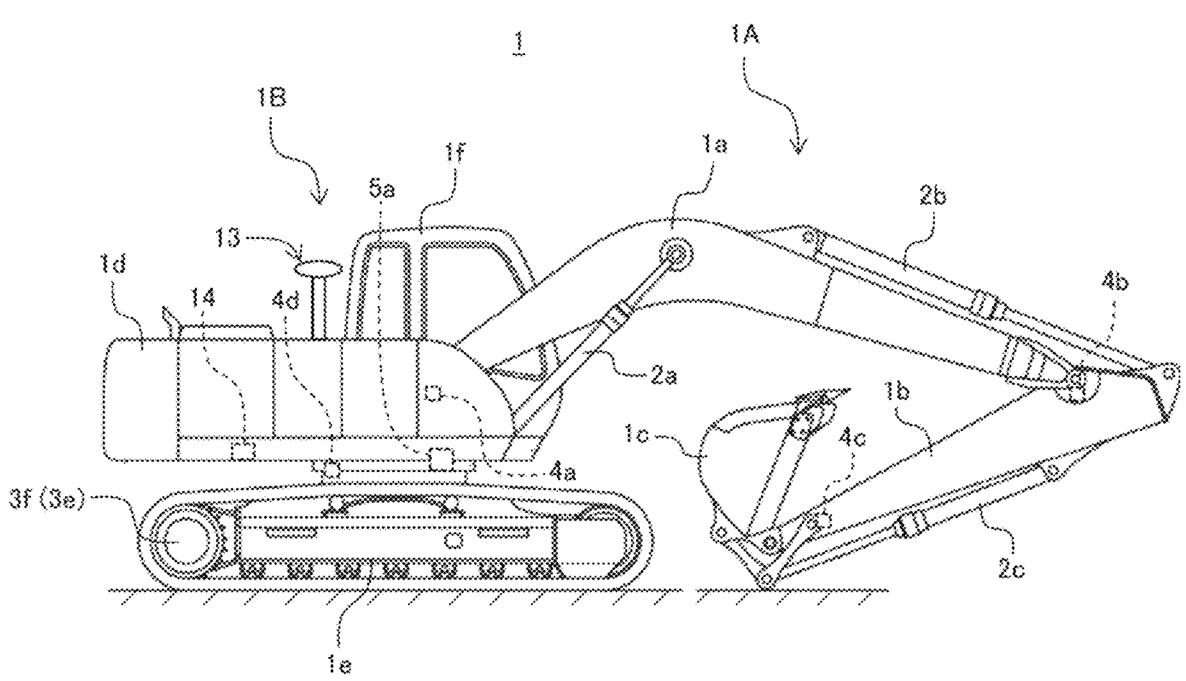
FIG. 1 is a side view schematically showing the appearance of a hydraulic excavator, which is an example of a work machine.
Figure 2:
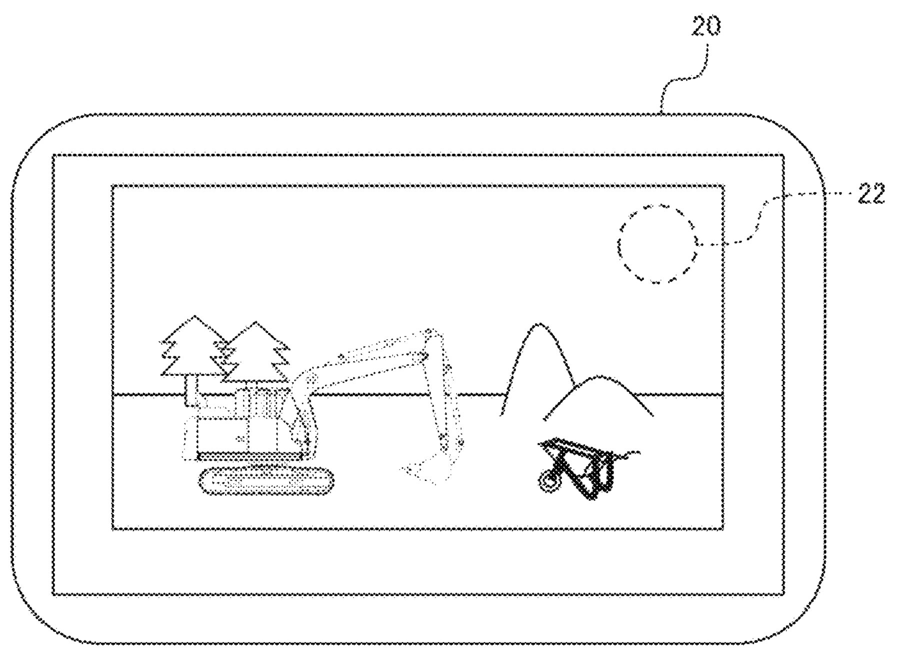
FIG. 2 is a diagram showing the appearance of a tablet, which is an example of a site environment information acquisition device.
Figure 3:
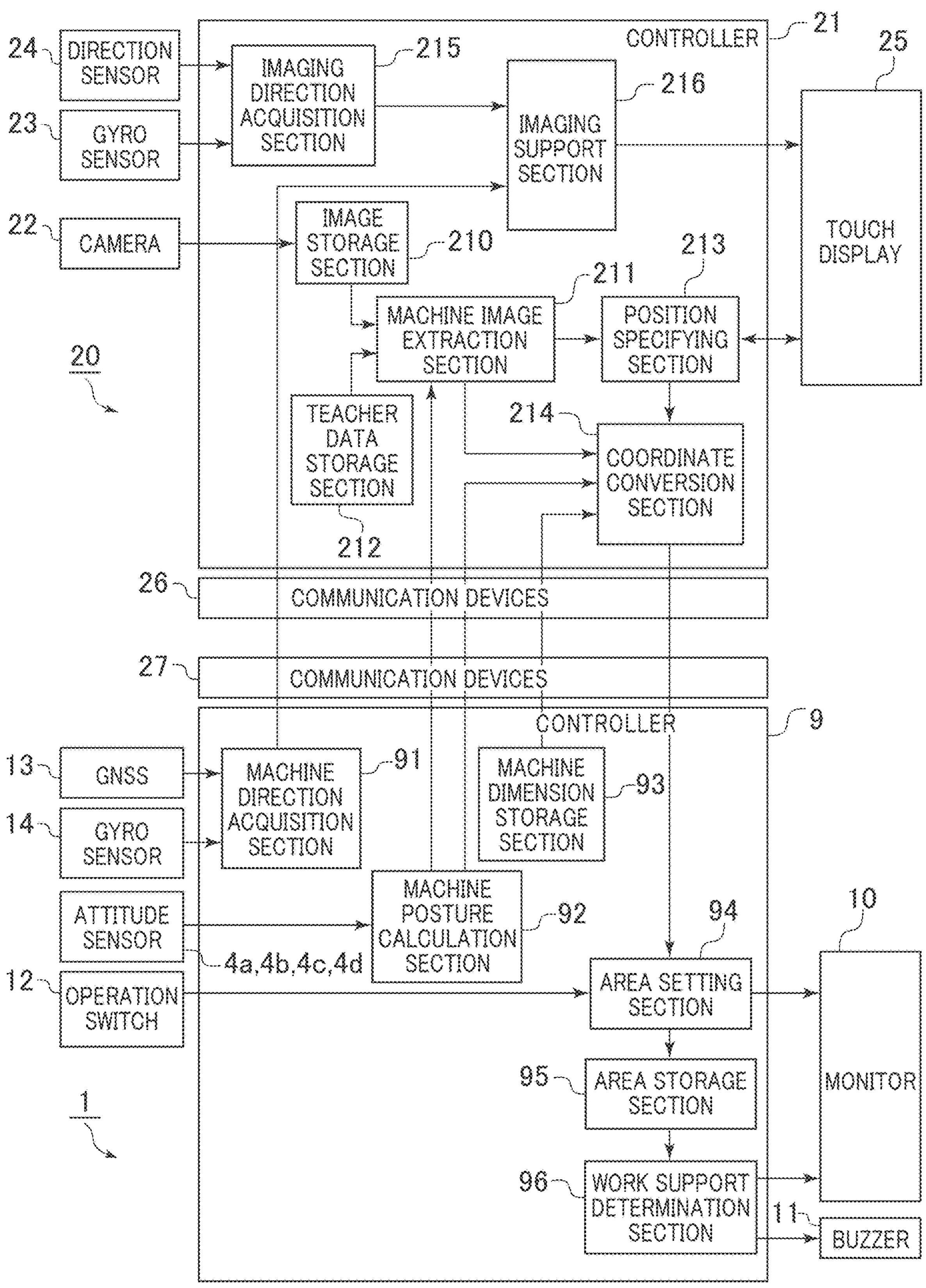
FIG. 3 is a functional block diagram schematically showing the overall configuration of the work support system.

FIG. 1 is a side view schematically showing the appearance of a hydraulic excavator, which is an example of a work machine according to this embodiment. FIG. 2 is a diagram showing the appearance of a tablet, which is an example of a site environment information acquisition device. Also, FIG. 3 is a functional block diagram schematically showing the overall configuration of the work support system.

In FIG. 1, the hydraulic excavator 1, which is a work machine, is schematically composed of a multi-jointed front work device 1A and a machine body 1B.

The machine body 1B includes a lower traveling body 1*e* that travels by the left and right traveling hydraulic motors 3*e*, 3*f*, and an upper swing body 1*d* that is provided on top of the lower traveling body 1*e* and is driven to swivel by the swing hydraulic motor 5*a*. In FIG. 1, only one of the traveling hydraulic motors 3*f* is shown, and the other traveling hydraulic motor 3*e* is indicated by a code in parentheses.

The front work device 1A is a work device composed of multiple driven members (boom 1*a*, arm 1*b*, bucket 1*c*) that rotate in the vertical direction, connected together. The base end of the boom 1*a* is rotatably supported by a boom pin at the front of the upper swing body 1*d*. Furthermore, the tip of the boom 1*a* is rotatably connected to the arm 1*b* via an arm pin. Moreover, the tip of the arm 1*b* is rotatably connected to the bucket 1*c* via a bucket pin and a bucket link.

The boom 1*a* is rotationally driven by the boom cylinder 2*a*. The arm 1*b* is rotationally driven by the arm cylinder 2*b*. The bucket 1*c* is rotationally driven by the bucket cylinder 2*c*.

Angle sensors (attitude sensors) 4*a*, 4*b*, 4*c*, 4*d* are provided at the connection between the upper swing body 1*d* and the boom 1*a*, the connection between the boom 1*a* and the arm 1*b*, the connection between the arm 1*b* and the bucket 1*c* (for example, the bucket link), and the connection between the lower traveling body 1*e* and the upper swing body 1*d*, respectively, to detect the relative angle of the boom 1*a* to the upper swing body 1*d*, the relative angle of the arm 1*b* to the boom 1*a*, the relative angle of the bucket 1*c* to the arm 1*b*, and the swivel angle of the upper swing body 1*d* to the lower traveling body 1*e*. Here, the angle sensors 4*a*, 4*b*, 4*c*, 4*d* constitute an attitude detection device for detecting the posture of the work device. It should be noted that the angle sensors 4*a*, 4*b*, 4*c*, 4*d* can be replaced by an inertial measurement unit (IMU) or the like that detects the relative angle to a reference surface. Additionally, the upper swing body 1*d* is equipped with a GNSS13 (Global Navigation Satellite System, only the antenna is shown in FIG. 1) as a position detection device for acquiring the position information (position coordinates) of the hydraulic excavator 1 at the work site, and a gyro sensor 14 for acquiring information on the orientation and inclination angle of the hydraulic excavator 1.

On the vehicle frame of the upper swing body 1*d*, an engine, hydraulic pump, electronic control valve, etc., not shown, are mounted. The flow rate and direction of the pressurized oil supplied to several hydraulic actuators (namely, traveling hydraulic motors 3*e*, 3*f*, swing hydraulic motor 5*a*, boom cylinder 2*a*, arm cylinder 2*b*, bucket cylinder 2*c*, etc.) discharged from the hydraulic pump driven by the engine are controlled by the electronic control valve, thereby controlling the operation of the hydraulic excavator 1.

Next to the front work device 1A in front of the upper swing body 1*d*, there is a cab 1*f* where the operator who operates the hydraulic excavator 1 is seated. Inside the cab 1*f*, there are plural electric operation levers (not shown) installed for the operator to operate the hydraulic excavator 1 while seated in the driver's seat. When the operator manipulates the operation lever, the amount of operation of each lever is converted into control command values for each hydraulic actuator 2*a*, 2*b*, 2*c*, 3*e*, 3*f*, 5*a* by the controller 9 (refer to FIG. 3) and sent to the electronic control valve, which then controls the flow rate and direction of the hydraulic oil supplied to each hydraulic actuator 2*a*, 2*b*, 2*c*, 3*e*, 3*f*, 5*a* according to the control command values. That is, by manipulating the operation lever, the operator can perform operations of the hydraulic excavator 1, such as the working motion of the front work device 1A, the swing motion of the upper swing body 1*d*, and the traveling motion of the lower traveling body 1*e*.

Furthermore, in the cab 1*f*, as shown in FIG. 3, there are installed a controller 9 that controls the overall operation of the hydraulic excavator 1, a monitor 10 as an input/output device, a buzzer 11 as a notification device, an operation switch 12 as a setting device, etc., which enable information presentation to the operator and various settings of the hydraulic excavator 1 by the operator.

The environmental information acquisition device shown in FIG. 2 is, for example, a tablet-type information terminal (hereinafter referred to as tablet 20), equipped with a touch display 25 and a camera 22 as input/output devices.

Also, as shown in FIG. 3, tablet 20 is equipped with a controller 21 that controls the operation of tablet 20, and a gyro sensor 23 and a direction sensor 24 as imaging direction detection devices for detecting the orientation of tablet 20 (i.e., the imaging direction by camera 22).

The controller 9 of the hydraulic excavator 1 and the controller 21 of tablet 20 are each equipped with communication devices 26,27, enabling them to communicate with each other wirelessly.

Here, the hydraulic excavator 1 (work machine) in this embodiment has a work support function that notifies the operator through notification devices such as monitor 10 and buzzer 11 when a part of the hydraulic excavator, such as the front work device 1A, exceeds a predetermined work range (also referred to as a work area). The work range is defined by, for example, the turning radius, turning angle, height, etc. In this embodiment, the work range is configured to be set based on information obtained from tablet 20.

As shown in FIG. 3, the work support system is constituted by the functional sections and related configurations of the controller 9 of the hydraulic excavator 1 and the controller 21 of tablet 20.

The controller 9 of the hydraulic excavator 1 has, as functional sections related to the work support system, a machine direction acquisition section 91, a machine posture calculation section 92, a machine dimension storage section 93, an area setting section 94, an area storage section 95, and a work support determination section 96. Furthermore, the controller 21 of tablet 20 has, as functional sections related to the work support system, an image storage section 210, a machine image extraction section 211, a teacher data storage section 212, a position specifying section 213, a coordinate conversion section 214, an imaging direction acquisition section 215, and an imaging support section 216.

Although not shown, both the controller 9 and the controller 21 are equivalent to computer hardware, comprising a CPU (Central Processing Unit) as a processing device, a program executed by the processing device, and a storage device (such as semiconductor memory like ROM, RAM, or a hard disk drive, etc.) that stores the program and the data necessary for its execution. That is, for example, in controllers 9 and 21, components such as the machine dimension storage section 93, the area storage section 95, and the teacher data storage section 212 are realized by storage devices such as hard disk drives, and other functional sections are realized by executing programs, etc., on the CPU.

Below, the details of each functional section of controllers 9 and 21 are explained in accordance with the workflow of the work support system.

First, the tablet 20 takes images with camera 22 to include the appearance of the hydraulic excavator 1 at the work site.

Figure 4:
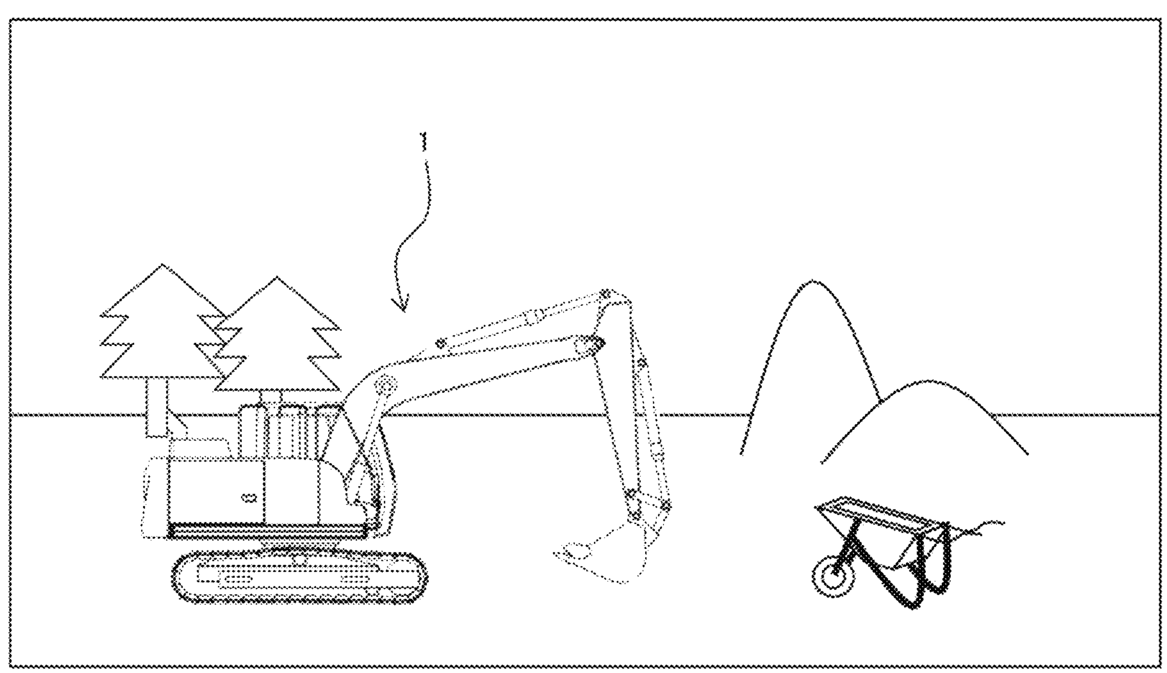
FIG. 4 is a diagram showing an example of an image captured by a tablet.

FIG. 4 is a diagram showing an example of an image captured by the tablet.

The imaging direction of camera 22 on tablet 20 is determined by which direction of the work range is set. For example, when setting the work range for the swing radius and height direction of the hydraulic excavator 1, imaging is done from the side of the hydraulic excavator 1 as shown in FIG. 4. Furthermore, when setting the work range for the swing angle, for example, the tablet 20 (or a function equivalent to camera 22) may be mounted on a drone or the like to take images of the hydraulic excavator 1 from a bird's-eye view. The images taken by camera 22 are stored in the image storage section 210, output to the machine image extraction section 211, and then output to the position specifying section 213 through the machine image extraction section 211.

The machine image extraction section 211 of controller 21 extracts the image area occupied by the hydraulic excavator 1 in the input image obtained from the image storage section 210 and outputs its coordinates.

Figure 5:
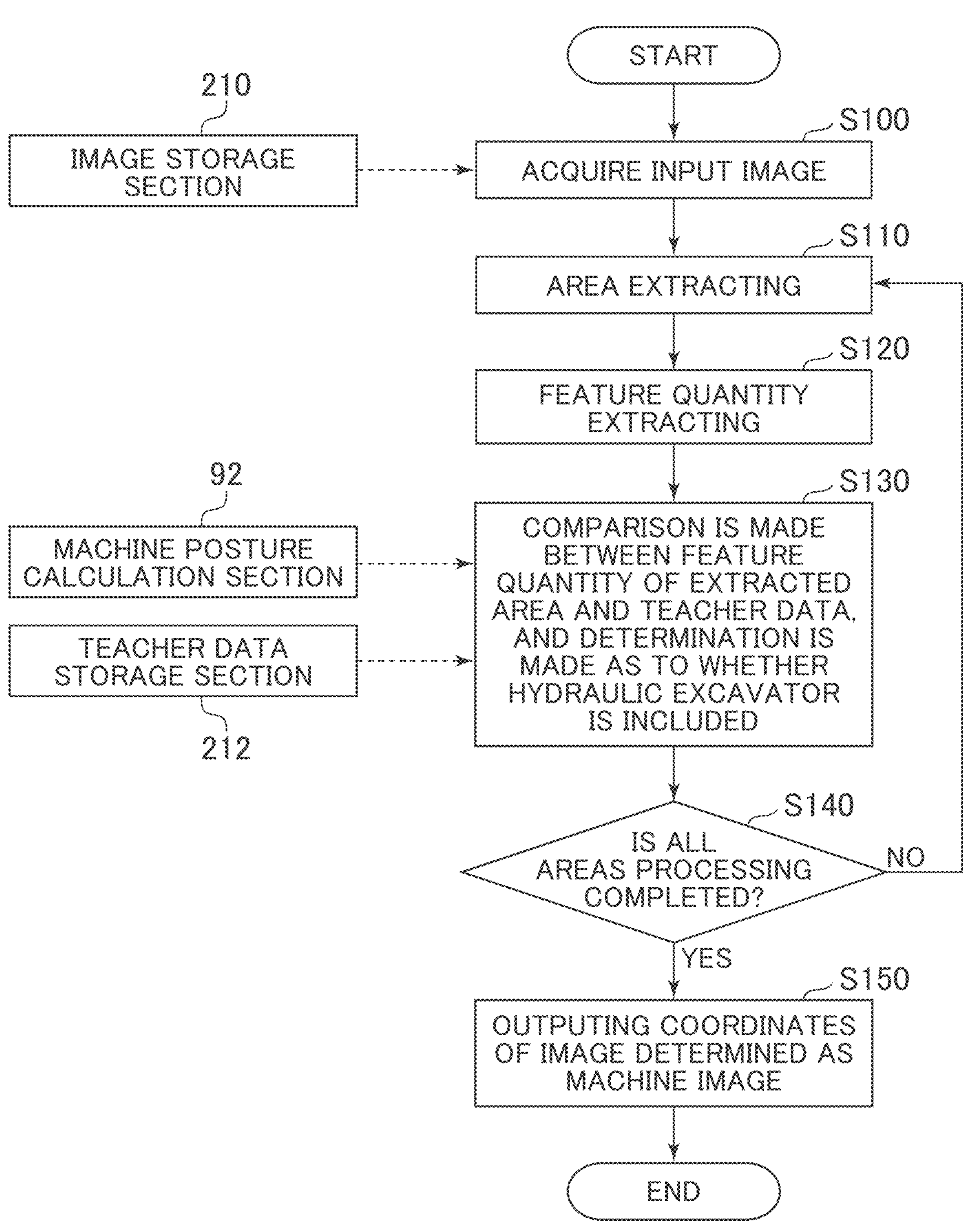
FIG. 5 is a flowchart showing the processing contents of the machine image extraction part.

FIG. 5 is a flowchart showing the processing content of the machine image extraction section.

As shown in FIG. 5, the machine image extraction section 211 first acquires the most recent image stored in the image storage section 210 as the input image (Step S100). It should be noted that the input image obtained by the machine image extraction section 211 can be configured to be selectable at will by the user through the operation of the touch display 25.

Subsequently, an image area of a predetermined size is extracted from the input image obtained in Step S100 (Step S110).

Then, the image feature quantity of the image area extracted in Step S110 is calculated (Step S120). For the calculation of the image feature quantity, an appropriate algorithm is constructed in advance according to the color and shape of the work machine (here, the hydraulic excavator 1) to be extracted.

Then, a comparison is made between the image feature quantity calculated in Step S120 and the teacher data previously stored in the teacher data storage section 212, and a determination is made as to whether the hydraulic excavator 1 (work machine) is included in the area extracted in Step S110 (Step S130).

The teacher data stored in the teacher data storage section 212 and used in Step S120 can take various forms, such as image data and feature quantity data of the hydraulic excavator 1 (work machine) in various postural states and taken from various viewpoints, or discriminant functions (classifiers) for the features constructed based on them.

It is also possible to select the teacher data used in the comparison process of Step S120. The machine posture calculation unit 92 of the controller 9 acquires the detection results from the angle sensors 4*a*, 4*b*, 4*c*, 4*d*, which are posture sensors (posture detection devices), as the current posture information (current posture) of the hydraulic excavator 1, and outputs it to the machine image extraction unit 211 and the like. By selecting the training data used in the comparison process of step S120 based on the current posture of the hydraulic excavator 1 obtained by the machine posture calculation unit 92, for example, it is possible to improve the extraction accuracy of the image of the hydraulic excavator 1, image processing speed, and so on.

In addition, when performing the same comparison process on previously captured images, the posture information of the hydraulic excavator 1 at the time of image is stored together with the image.

Next, it is determined whether the comparison process for all areas in step S130 has been completed (step S140), and if the determination result is NO, a new image area different from the image area extracted up to the previous cycle from the input image acquired in step S100 is extracted (step S110), and the process of steps S120, S130 is performed on the extracted image area. That is, the process from step S110 to S130 is repeated until the determination result in step S140 is YES.

Furthermore, if the determination result in step S140 is YES, that is, if the process of steps S110 to S130 for all areas of the input image acquired in step S100 has been completed, then, the coordinates of the image area determined as the machine image (hydraulic excavator 1) are output to the position specifying unit 213 and the coordinate conversion unit 214 (step S150), and the process is terminated. If there are multiple image areas determined to include the hydraulic excavator 1 (work machine), the image area determined to be closest to the training data in the determination process of step S130 is selected, and its coordinates are output.

The position specifying section 213 of the controller 21 displays the image sent from the image storage section 210 through the machine image extraction section 211 on the touch display 25 and prompts the operator to select the position of the endpoint of a specified area of the image on the touch display 25.

Figure 6:
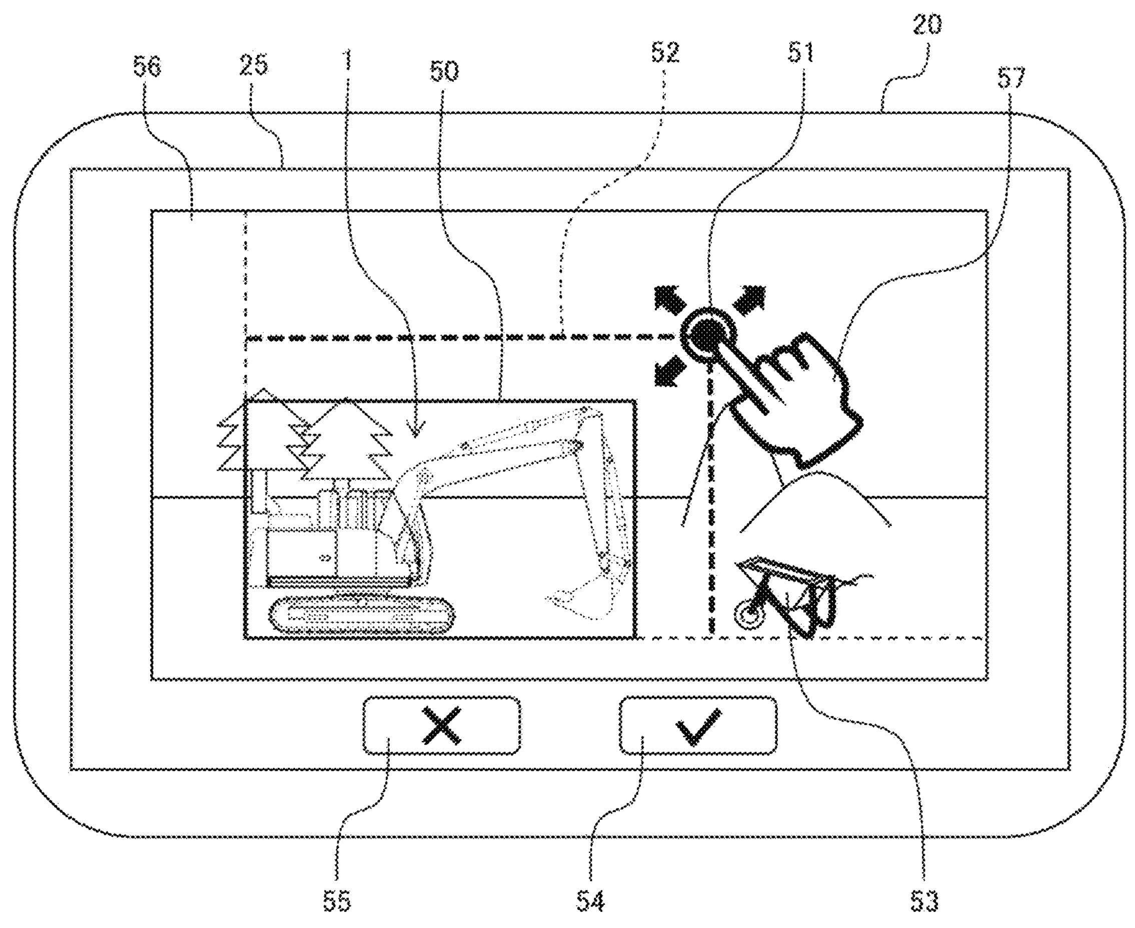
FIG. 6 is a diagram showing an operator selecting an area of the image displayed on the touch display.

FIG. 6 is a diagram showing how the operator selects the area of the image displayed on the touch display.

As shown in FIG. 6, the input image 56 sent from the image storage section 210 is displayed on the touch display 25 of the tablet 20, and the image area 50 extracted by the machine image extraction section 211 for the input image 56 is shown. In this state, by the operator indicating the position where they want to set the work area with a finger or similar (such as the operator's hand 57 or a touch pen schematically shown in FIG. 6), the area endpoint 51 is drawn, and the work area 52 is drawn such that the area endpoint 51 becomes the boundary position in the height direction and the turning radius direction, based on the image area of the hydraulic excavator 1 (work machine). As a method for the operator to select the area endpoint 51, for example, in the case of work support intended to prevent contact between the hydraulic excavator 1 and an obstacle 53, the position is specified on the touch display 25 so that the area endpoint 51 is located between the hydraulic excavator 1 and the obstacle 53. If the set position of the work area 52 is drawn at the intended position, the operator presses the decision button 54 and proceeds to the next process (processing by the coordinate conversion section 214). Furthermore, if the operator does not set the area endpoint 51 (i.e., set the work area), they will press the cancel button 55 to terminate the process.

In this embodiment, an example is described where the boundary is set around the hydraulic excavator 1 to designate its interior as the work area. However, this is not limited to such an arrangement. For example, it is also possible to configure by setting a boundary around obstacles, etc., and designating the interior as an area to be excluded from the work area.

The coordinate conversion section 214 of the controller 21 converts the work area set by the operator on the touch display 25 into real space values (coordinate values of real space coordinates).

Figure 7:
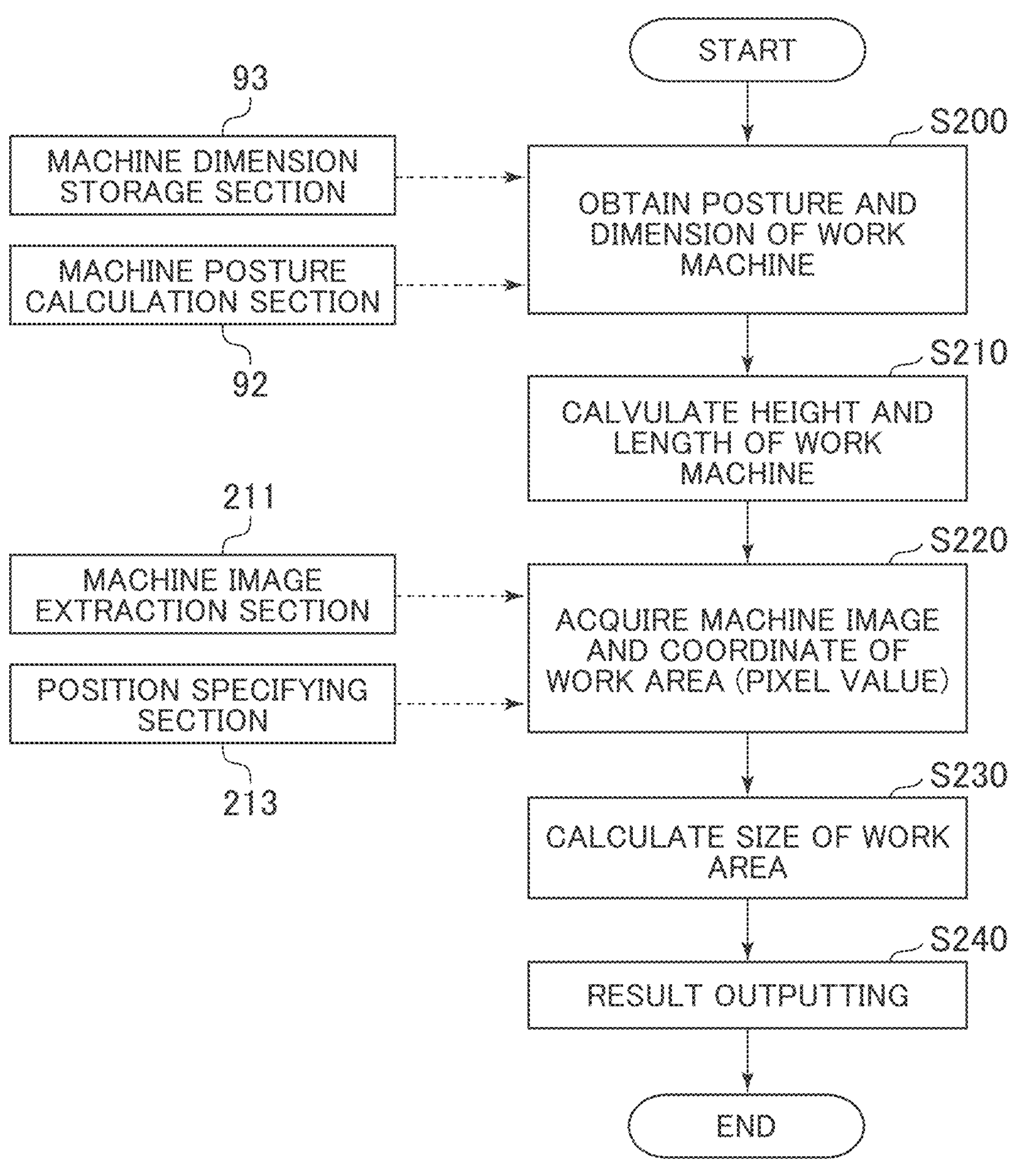
FIG. 7 is a flowchart showing the processing contents of the coordinate conversion part.

FIG. 7 is a flowchart showing the processing contents of the coordinate conversion section.

As shown in FIG. 7, the coordinate conversion section 214 first obtains the current posture (posture information) of the hydraulic excavator 1 from the machine posture calculation section 92, and also retrieves the dimension values of various sections of the hydraulic excavator 1, which are stored in advance in the machine dimension storage section 93 of the controller 9 (Step S200). When specifying a position using previously captured images, the posture information of the hydraulic excavator 1 at the time of image capture, stored together with the image, is used to retrieve the posture information along with the loading of the previously captured images.

Next, based on the posture information and dimension values obtained in Step S200, the coordinate conversion section 214 calculates the height and the length in the front direction (the longitudinal direction of the front work device 1A as seen from above the turning axis) of the hydraulic excavator 1 (Step S210).

Next, the coordinates of the area outputted from the machine image extraction section 211 (the image area occupied by the hydraulic excavator 1) and the area outputted from the position designation section 213 (the predetermined area set by the operator) are acquired as pixel values (Step S220).

Then, using the ratio of the actual dimensions of the hydraulic excavator 1 obtained in Step S210 to the pixel values of the hydraulic excavator 1 obtained in Step S220, the size of the designated work area is converted from pixel values to values in real space (Step S230), the calculated results are output to the area setting section 94 of the controller 9 (Step S240), and the process is completed.

The area setting section 94 of the controller 9 of the hydraulic excavator 1 sets the area to be activated in the work support function of the hydraulic excavator 1 based on the information of the work area transmitted from the coordinate conversion section 214 of the controller 21 of the tablet 20.

Figure 8:
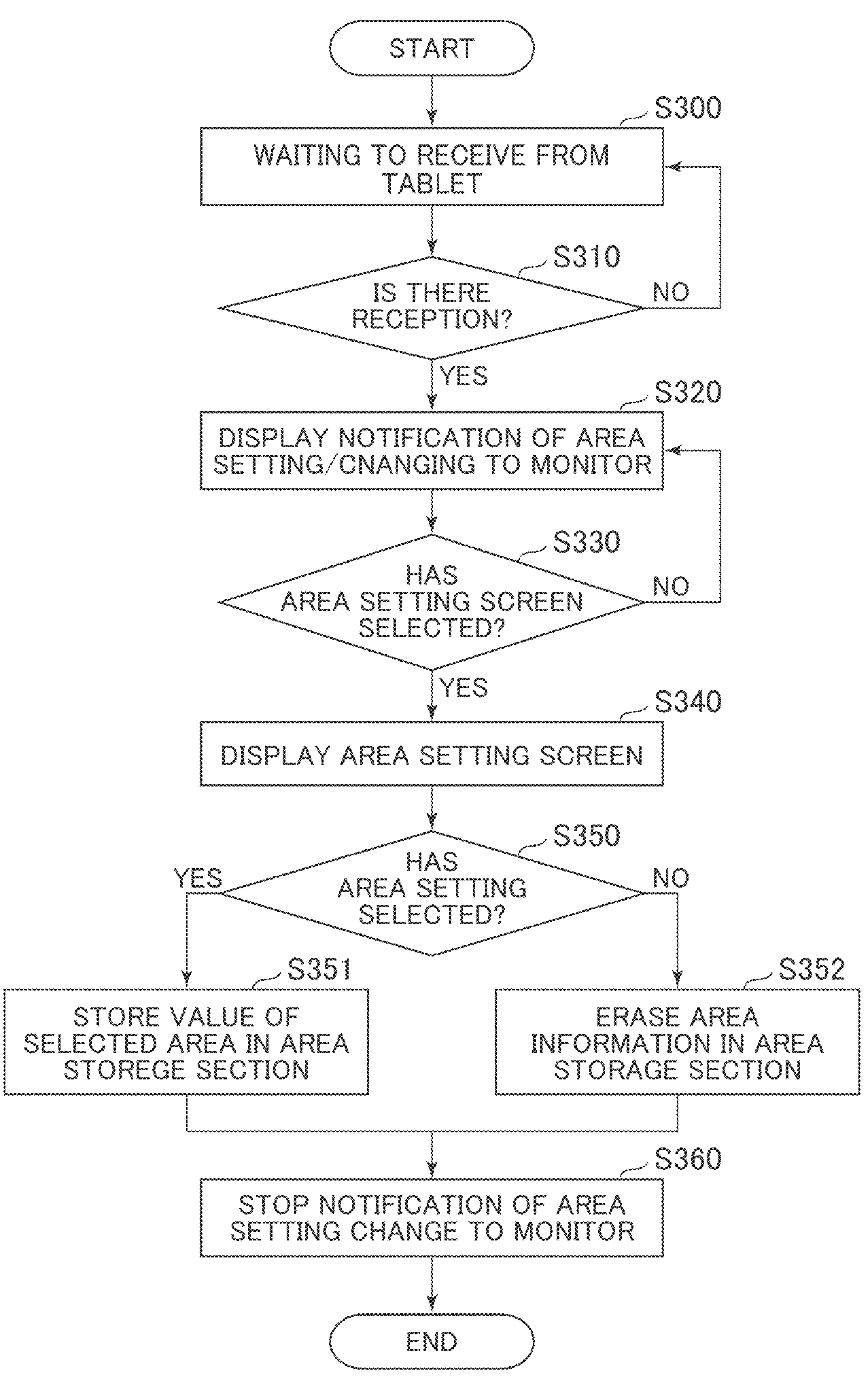
FIG. 8 is a flowchart showing the processing contents of the area setting part.

FIG. 8 is a flowchart showing the processing contents of the area setting section.

As shown in FIG. 8, the area setting section 94 enters a state of waiting to receive information from the tablet 20 (Step S300) and determines whether there has been a reception from the tablet 20 (Step S310). Steps S300, S310 indicate a state of waiting for communication between the tablet 20 and the hydraulic excavator 1. If the determination result at Step S300 is NO, the process of Steps S300, S310 is repeated until the determination result becomes YES, that is, until information about the work area is received from the tablet 20.

Furthermore, if the determination result at Step S300 is YES, that is, if information has been received from the tablet 20, a notification (alert) is made to the operator that the work area has been set (changed) on the tablet 20 (Step S320). Notifications to the operator are made, for example, by displaying icons or messages on the monitor 10 or sounding an alert from the buzzer 11.

Next, it is determined whether the display on the monitor 10, etc., of the area setting screen (see later FIG. 10) has been selected by the operation switch 12, etc. (Step S330). It is conceivable that the hydraulic excavator 1 receives the setting information of the work area while operating, so if the judgment result at step S330 is NO, the process of steps S320 and S330 is repeated until the judgment result becomes YES, that is, until the operator recognizes the notification and selects to transition to the area setting screen on monitor 10, continuing the notification to the operator.

Furthermore, if the judgment result at step S330 is YES, the display on monitor 10 is transitioned to the area setting screen (step S340), and it is determined whether the area setting has been selected (step S350).

Figure 9:
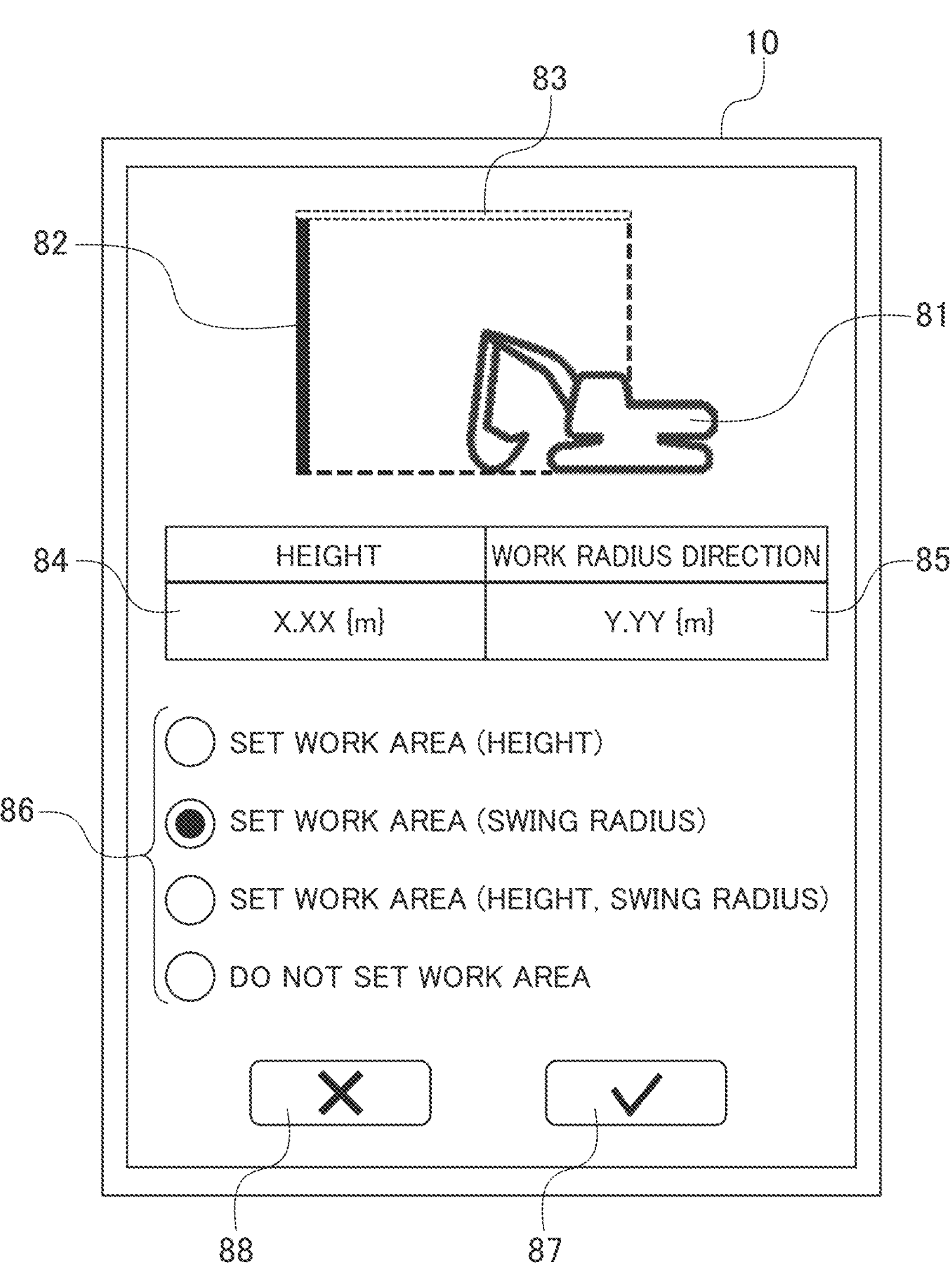
FIG. 9 is a diagram showing an example of an area setting screen.

FIG. 9 is a diagram showing an example of the area setting screen.

As shown in FIG. 9, the area setting screen displayed on monitor 10 includes displays of the active state of the work area, the setting values of the work area, options for the type of work area to be set and displays for deciding or canceling the settings.

As an indication of the active state of the work area, for example, lines 82 and 83 are displayed, which show the active state in the swing radius direction and the height direction, respectively, along with an icon 81 representing the hydraulic excavator 1. When setting (activating) the work area only in the swing radius direction of the hydraulic excavator 1, line 82 is highlighted (activated) as illustrated in FIG. 9 to indicate that the work area in the swing radius direction is active, while deactivating line 83 indicates that the work area in the height direction is not set (deactivated). Similarly, when setting (activating) the work area only in the height direction of the hydraulic excavator 1, line 83 is highlighted while line 82 is deactivated. Furthermore, when setting (activating) the work area for both the swing radius and height directions of the hydraulic excavator 1, lines 82 and 83 are highlighted, and when not setting the work area for both the swing radius and height directions, lines 82 and 83 are deactivated.

The setting values for the work area transmitted from tablet 20 are displayed as the height direction setting value 84 and the work radius direction (swing radius direction) setting value 85. The operator of the hydraulic excavator 1 determines how to set (activate) the work area by referring to these setting values 84, 85. That is, among the work areas intuitively set on the display 25 of tablet 20 by the operator (photographer) with the intention of avoiding obstacles 14, etc. (see FIG. 6), the upper boundary part is set as the height direction setting value 84, and the side boundary part is set as the work radius direction setting value 85. The operator of the hydraulic excavator 1 can selectively activate or deactivate the boundaries of the work area set with setting values 84, 85 on monitor 10, thus intuitively and easily setting the intended work area.

As an example of options for the type (e.g., direction) of work area to be set, radio button-style selection buttons 86 are displayed. As illustrated in FIG. 9, when the option to set the work area only in the swing radius direction of the hydraulic excavator 1 ('Set work area (swing radius)') is selected, line 82, which indicates the active state in the swing radius direction, is highlighted in response, and line 83, which indicates the active state in the height direction, is deactivated.

For determining or cancelling settings, options such as a confirm button 87 and a cancel button 88 are displayed.

By selecting the confirm button 87 after choosing the work area to be set, the settings for the work area are applied, and the work support function is activated. Furthermore, by selecting the cancel button 88, the settings for the work area are discarded.

It is also possible to configure the system to receive images captured with a tablet 20 and display them on the area setting screen, including illustrations of the positions set as the work area. In other words, by displaying the captured images and the positions of the areas, it is possible to make it easier for the operator to recognize the set positions of the work areas.

Returning to FIG. 8.

As shown in FIG. 8, if the decision result at step S350 is YES, that is, if the setting of the area is selected, the value of the selected area is stored in the area storage section 95 (step S351), and the notification of area setting changes to the monitor 10 is stopped (step S360), and the process is terminated.

Furthermore, if the decision result at step S350 is NO, that is, if no area is set, then all information of the areas stored in the area storage section 95 at that time is erased (step S352), and the notification of area setting changes to the monitor 10 is stopped (step S360), and the process is terminated.

The work support determination section 96 determines the need for work support based on the information of the areas stored in the area storage section 95 and the current posture (posture information) of the hydraulic excavator 1 calculated by the machine posture calculation section 92, and if support is needed, notifies the operator through the monitor 10 or buzzer 11.

Figure 10:
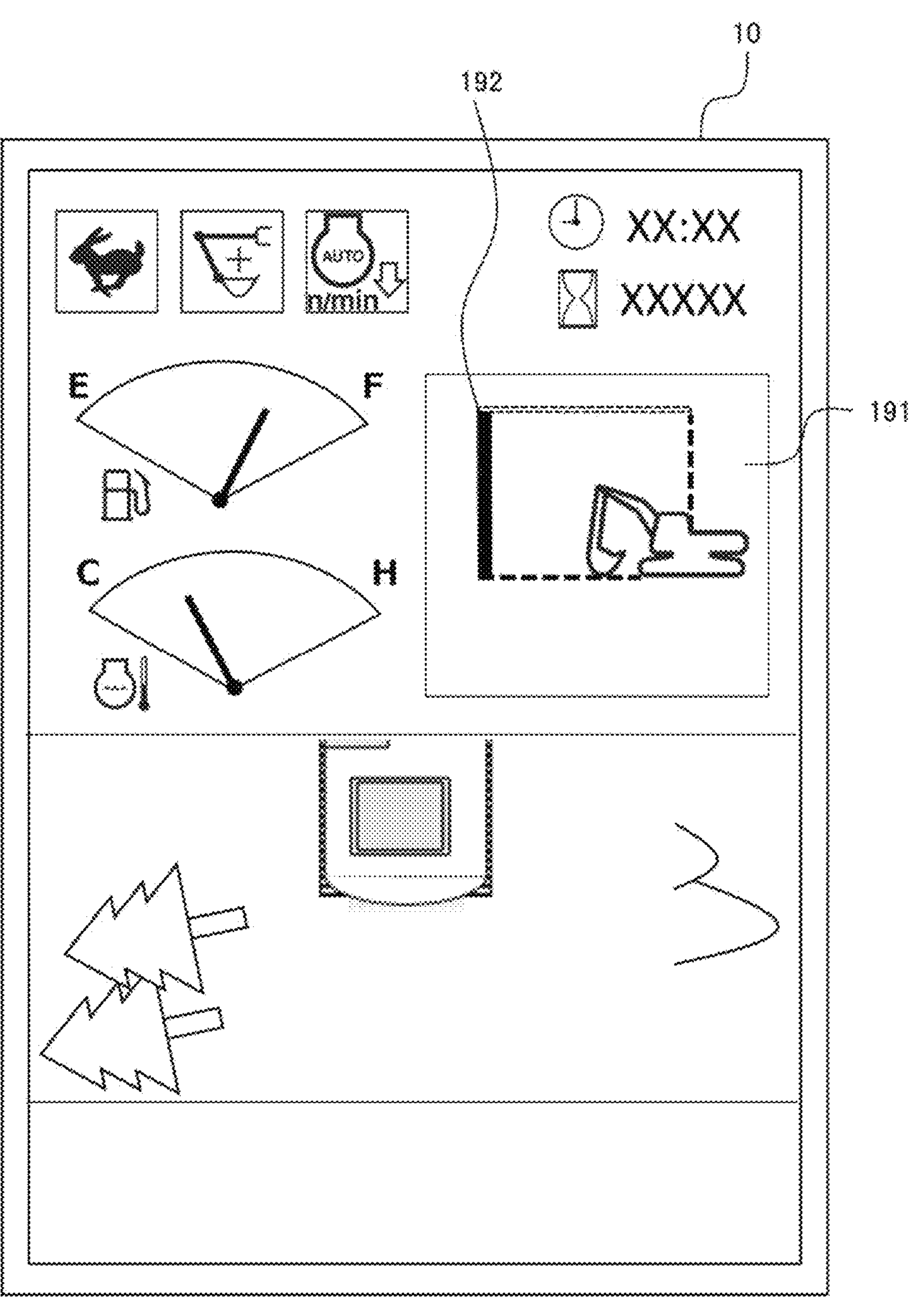
FIG. 10 is a diagram showing a display example of a monitor in its normal state indicating whether work support is available or not.
Figure 11:
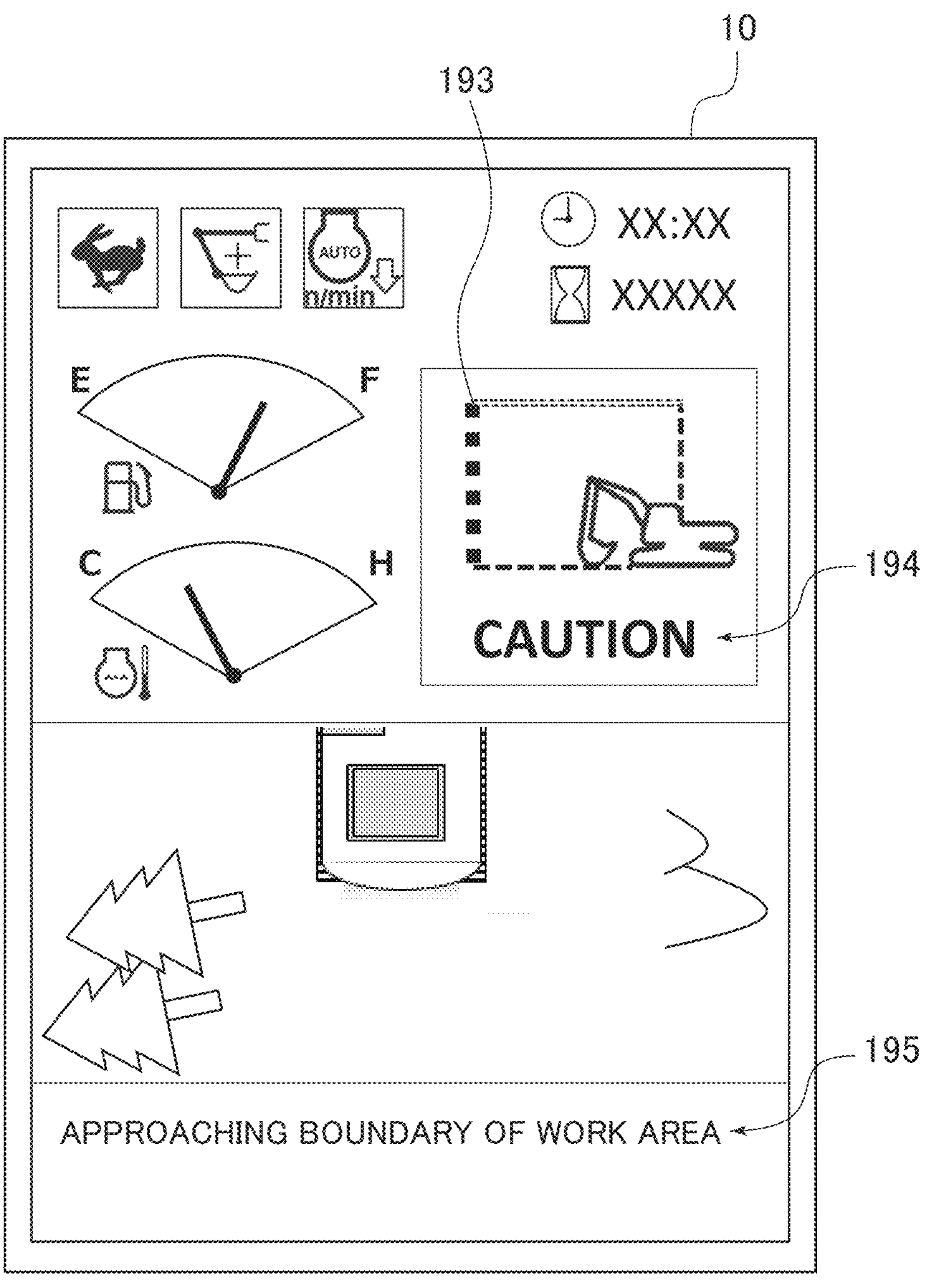
FIG. 11 is a diagram showing a display example of a monitor in its approach state indicating whether work support is available or not.
Figure 12:
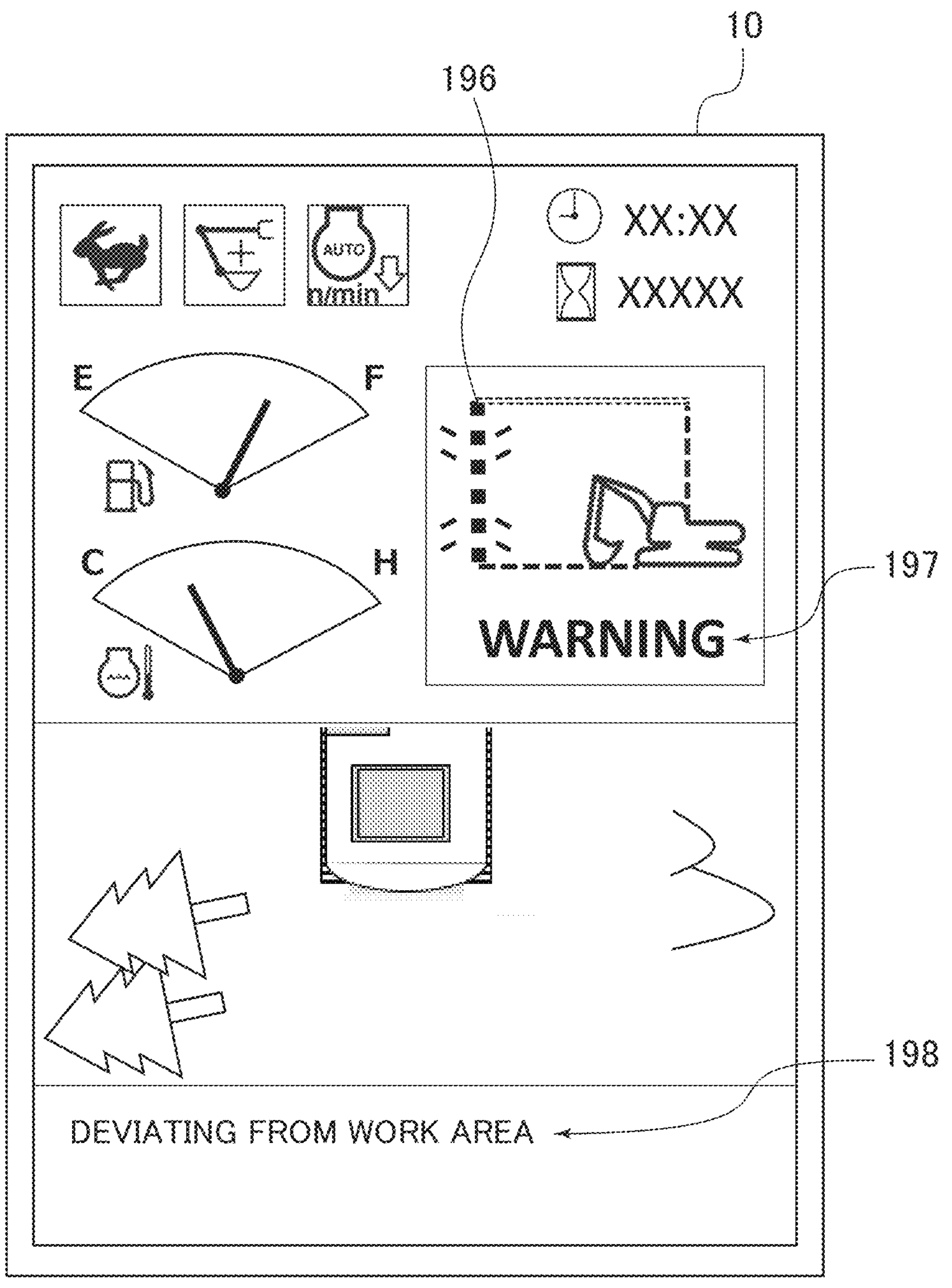
FIG. 12 is a diagram showing a display example of a monitor in its deviation state indicating whether work support is available or not.

FIGS. 10 to 12 are diagrams showing examples of monitor displays indicating the presence or absence of work support.

FIG. 10 is a diagram showing an example of the display in a normal state.

As shown in FIG. 10, when a work area is set, a display 191 indicating the state of the work support function is shown on the monitor 10. If work is being performed within the set area and there is no concern of deviating from the work area, only the display 192 indicating the effective state of the set work area is shown. Note that FIG. 10 illustrates an example where only the work area in the direction of the turning radius is set. FIG. 11 is a diagram showing an example of the display in a proximity state.

As shown in FIG. 11, if it is determined that there is a high possibility of deviating from the work area by approaching the boundary of the work area, the display mode of display 192 is changed, for example, to display 193 using warning colors such as yellow or red, to alert the operator. At this time, it is desirable to also display messages 194, 195 for the purpose of alerting.

FIG. 12 is a diagram showing an example of the display in a deviation state.

As shown in FIG. 12, if there is a deviation from the work range, display 193 is made to blink as display 196 to further alert the operator, and messages 197, 198 to notify that there is a deviation from the work area are also displayed together.

Thus, the work support function enables efficient work by notifying the operator when there is a possibility of deviating from the predetermined work area or when the work area has been deviated from.

In this embodiment, support is provided through notifications from monitor 10 and buzzer 11, but for example, an electronic control valve could be installed to restrict the operation of the hydraulic excavator 1, such as deceleration or stopping according to the state of approach or deviation, based on command values from the work support judgment section 96.

The imaging direction acquisition section 215 of the controller 21 of the tablet 20 calculates and acquires the imaging direction of the camera 22 of the tablet 20 based on information (orientation information) from the direction sensor 24 provided in the tablet 20 and information (inclination information) from the gyro sensor 14, and outputs it to the imaging support section 216.

The machine direction acquisition section 91 of the controller 9 of the hydraulic excavator 1 calculates and acquires the direction (orientation) and inclination angle of the hydraulic excavator 1 based on information (position information, orientation information) from the GNSS 13 provided in the hydraulic excavator 1 and information (inclination information) from the gyro sensor 14, and outputs it to the imaging support section 216 of the controller 21 of the tablet 20.

The imaging support section 216 of the controller 21 of the tablet 20 supports the operation of the tablet 20 by displaying navigation on the touch display 25 to ensure the imaging direction of the camera 22 of the tablet 20 is in the correct direction, based on information regarding the imaging direction sent from the imaging direction acquisition section 215 and information regarding the direction (orientation) of the hydraulic excavator 1 transmitted from the machine direction acquisition section 91 of the controller 9 of the hydraulic excavator 1.

Figure 13:
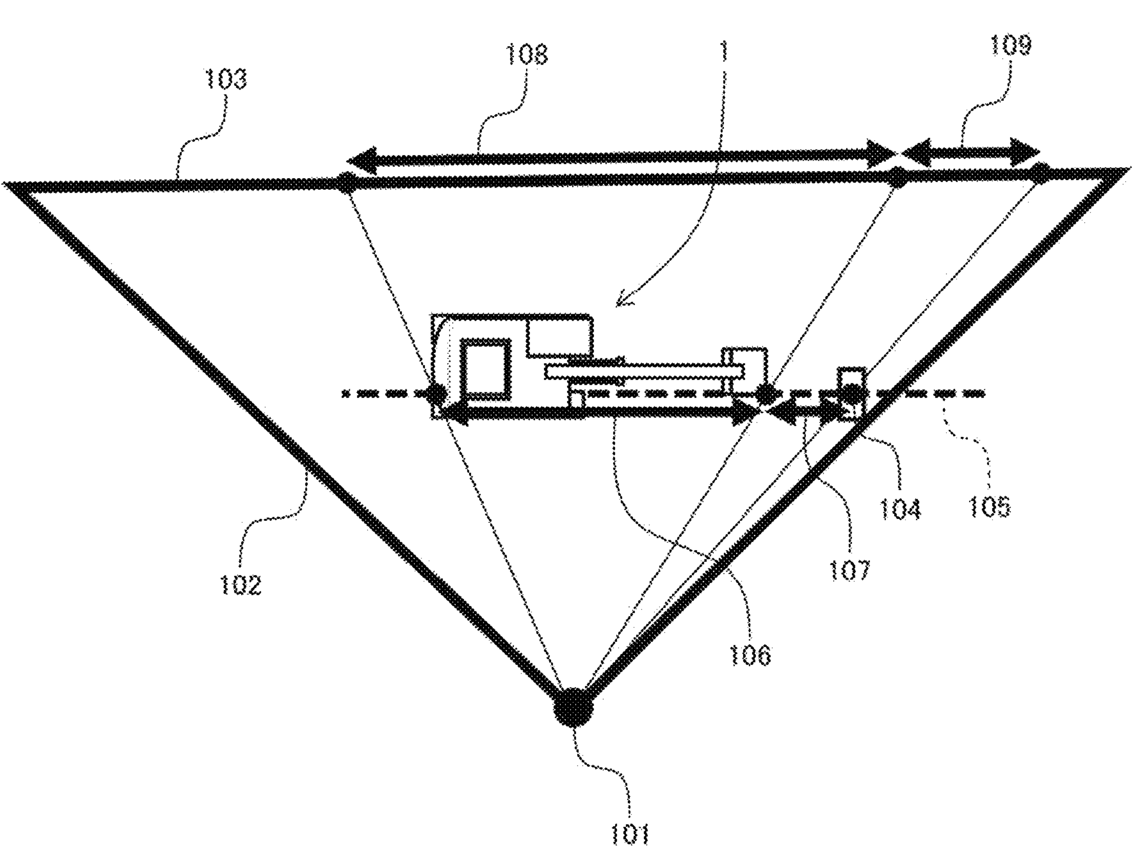
FIG. 13 is a diagram explaining the difference in appearance of a hydraulic excavator due to different imaging directions.
Figure 14:
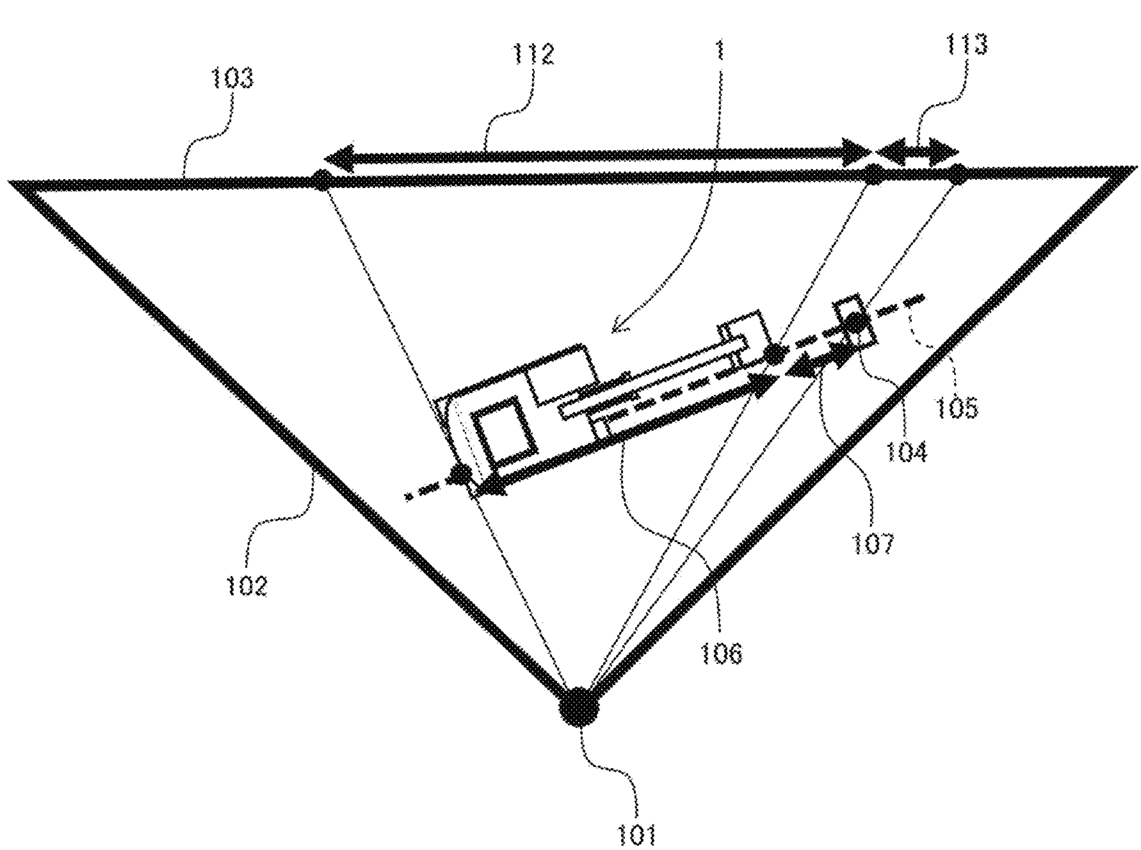
FIG. 14 is a diagram explaining the difference in appearance of a hydraulic excavator due to different imaging directions.

FIGS. 13 and 14 are diagrams explaining the difference in the appearance (size) of the hydraulic excavator due to the difference in imaging direction. In FIGS. 13 and 14, examples are shown of viewing the hydraulic excavator 1 from an overhead perspective, where FIG. 13 shows the case where the imaging surface of the camera and the orientation of the hydraulic excavator are parallel, and FIG. 14 shows the case where they are not parallel.

As shown in FIG. 13, when photographing the hydraulic excavator 1 with the camera 22 from a certain imaging position 101, if the orientation 105 of the hydraulic excavator 1 and the imaging surface 103 of the camera 22 are parallel, the ratio of the actual size 106 of the hydraulic excavator 1 to the distance 107 from the bucket tip of the hydraulic excavator 1 to the obstacle 104 will be the same as the ratio of the lengths 108 and 109 respectively projected on the imaging surface 103. Thus, if the actual size 106 of the hydraulic excavator 1 is known, it is possible to estimate the distance 107 to the obstacle 104 using the ratio of the number of pixels in the relevant part of the photographed image.

On the other hand, as shown in FIG. 14, if the orientation 105 of the hydraulic excavator 1 and the imaging surface 103 of the camera 22 are not parallel, the ratio of the actual size 106 of the hydraulic excavator 1 and the distance 107 from the bucket tip of the hydraulic excavator 1 to the obstacle 104 will differ from the ratio of the lengths 112 and 113 respectively projected on the imaging surface 103. Thus, when estimating the distance 107 to the obstacle 104 using the ratio of the number of pixels in the relevant part of the photographed image, the accuracy of the estimation result will decrease. Therefore, during imaging, it is necessary to navigate the imaging so that the direction of the hydraulic excavator 1 (i.e., the direction of the front work device 1A) and the imaging surface of the camera 22 are parallel.

Figure 15:
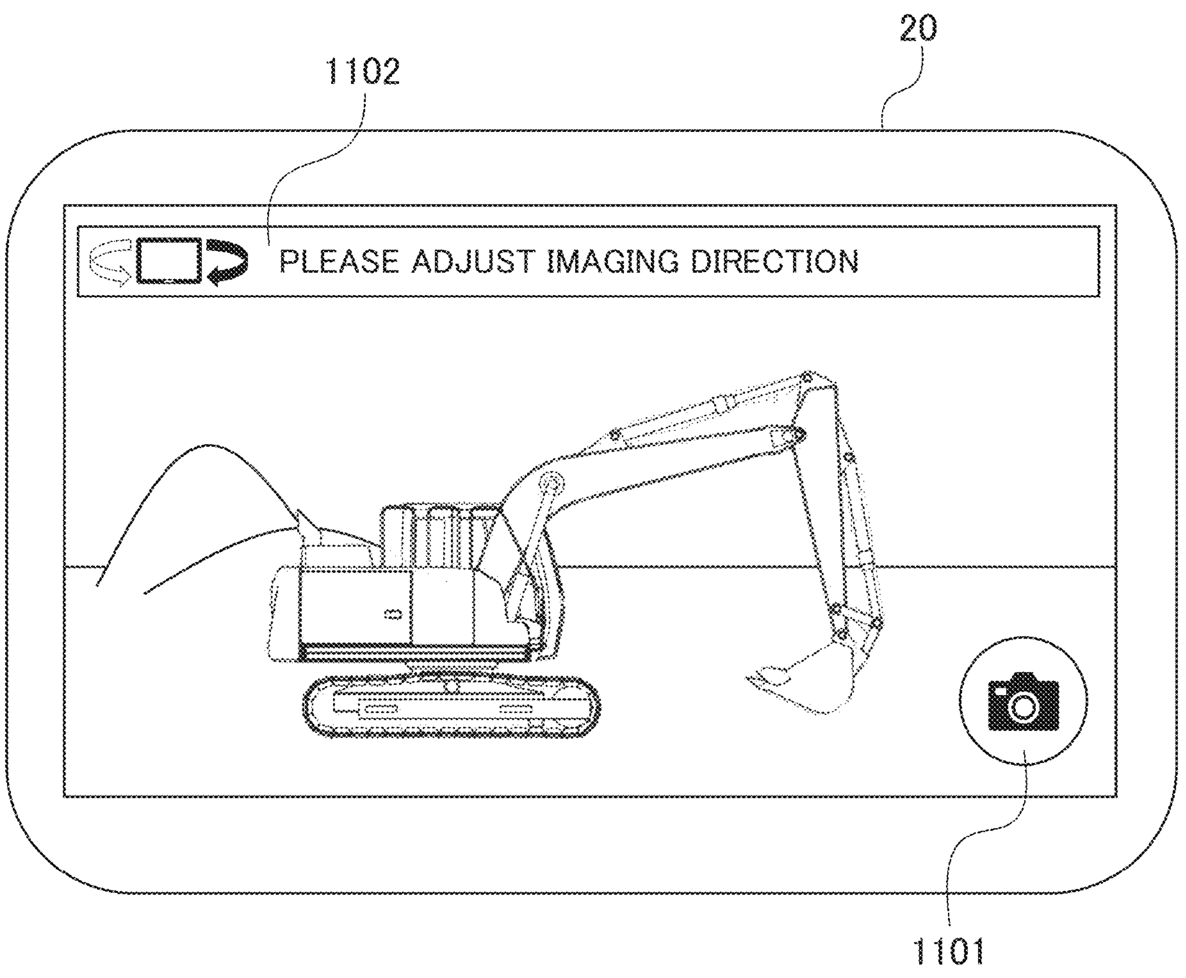
FIG. 15 is a diagram showing an example of navigation of the imaging direction by the imaging support part.

FIG. 15 is a diagram showing an example of navigation of the imaging direction by the imaging support section.

The imaging support section 216 calculates the relative angle between the tablet 20 and the direction of the front work device 1A based on information from the imaging direction acquisition section 215 and the machine direction acquisition section 91, and if the relative angle exceeds a predetermined threshold, as shown in FIG. 15, it navigates by tilting the camera 22 of the tablet 20 in a specific direction (for example, displaying a message 1102 prompting adjustment of the imaging direction). Furthermore, if the relative angle is below a predetermined threshold, a message prompting imaging is displayed (not shown), and the photographer can take an image by pressing the imaging button 1101. Note that the navigation may be performed not only in the yaw direction of the hydraulic excavator 1 but also in various directions such as the roll direction and the pitch direction, depending on the imaging position.

The effects of the embodiment configured as described above are explained.

In this embodiment, in a work support system equipped with a work device (for example, front work device 1A) provided on a work machine (for example, hydraulic excavator 1), a posture detection device (for example, angle sensors 4*a*, 4*b*, 4*c*, 4*d*) that detects the posture information of the work device, and a controller (9,21) that provides work support for the work machine based on a predetermined and stored work area, further comprising an imaging device (for example, camera 22) capable of imaging the appearance of the work machine at the work site, and an input device (for example, touch display 25) capable of specifying any position within the image taken by the imaging device, the controller extracts the image area occupied by the work machine from the image taken by the imaging device, and based on the number of pixels in the longitudinal direction of the work machine in the extracted image area, the posture information of the work machine, and the actual dimensions of the work machine, it converts the position specified in the image by the input device into real space coordinates, and sets the work area so that the position of the converted coordinates becomes the endpoint, thus allowing the intended work area to be set intuitively and easily.

<Note>

It should be noted that the present invention is not limited to the above embodiments and includes various modifications and combinations within the scope not departing from the gist of the invention.

Furthermore, the present invention is not limited to having all the configurations described in the above embodiments, and also includes those from which part of the configurations have been omitted.

Moreover, the above configurations and functions, etc., may be realized by, for example, designing them in part or in whole with integrated circuits.

Furthermore, the above configurations and functions, etc., may be realized in software by a processor interpreting and executing a program that implements each function.

DESCRIPTION OF REFERENCE CHARACTERS

1: Hydraulic excavator
1A: Front work device
1B: Machine body
1*a*: Boom
1*b*: Arm
1*c*: Bucket
1*d*: Upper swing body
1*e*: Lower traveling body
1*f*: Cab
2*a*: Boom cylinder
2*b*: Arm cylinder
2*c*: Bucket cylinder
3*e*, 3*f*: Traveling hydraulic motor
4*a*, 4*b*, 4*c*, 4*d*: Angle sensor (posture sensor)
5*a*: Swing hydraulic motor
9, 21: Controller
10: Monitor
11: Buzzer
12: Operation switch
14: Gyro sensor
20: Tablet
22: Camera
23: Gyro sensor
24: Direction sensor
25: Touch display
26, 27: Communication device
50: Image area
51: Area endpoint
52: Work area
53: Obstacle
54: Decision button
55: Cancel button
56: Input image
57: Operator's hand
81: Icon
82, 83: Lines
84, 85: Set values
86: Selection button
87: Decision button
88: Cancel button
91: Machine direction acquisition section
92: Machine posture calculation section
93: Machine dimension storage section
94: Area setting section
95: Area storage section
96: Work support determination section
101: Imaging position
102: Angle of view
103: Imaging surface
104: Obstacle

106: Actual dimension
107: Distance
191, 192, 193, 196: Display
194, 195, 197, 198: Message
210: Image storage section
211: Machine image extraction section
212: Teacher data storage section
213: Position designation section
214: Coordinate transformation section
215: Imaging direction acquisition section
216: Imaging support section
1101: Imaging button
1102: Message

The invention claimed is:

1. A work support system comprising:

a work device provided on a work machine, a posture detection device that detects posture information of the work device, a controller that performs work support for the work machine based on a predetermined and stored work area around the work machine, an imaging device capable of imaging the appearance of the work machine at the work site, and an input device capable of specifying any position as an area endpoint within the image captured by the imaging device, wherein the controller is configured to:

based on a predetermined teacher data, extract the image area occupied by the work machine from the image captured by the imaging device, based on the posture information detected by the posture detection device and a dimension values of various sections of the work machine which stored in advance, calculate the actual dimensions in the longitudinal direction of the work machine, based on the number of pixels in the longitudinal direction of the work machine in the extracted image area, and the calculated actual dimensions in the longitudinal direction of the work machine, convert the position of the area endpoint specified in the image by the input device into real space coordinate values, and set the work area such that the position of the converted coordinate values becomes an endpoint.

2. The work support system according to claim 1, wherein the controller is configured to:

calculate the distance or angle in two directions based on the work machine, based on the coordinates of the position specified by the input device, and set the range formed using the calculated distance or angle in the two directions as the work area.

3. The work support system according to claim 1, further comprising a position detection device that acquires the position coordinates of the work machine, a imaging direction detection device that detects an imaging direction of the imaging device, and a notification device that notifies information to an operator of the work machine, wherein the controller is configured to:

determine whether the imaging direction by the imaging device is suitable for the position designation by the input device of the work area, based on the relative angle between the position coordinates of the work machine and the imaging direction of the imaging device, and if the controller determines that the imaging direction is not appropriate, notify through the notification device to prompt for an appropriate imaging direction.

4. A work support system comprising:

a work device provided on a work machine, a posture detection device that detects posture information of the work device, a controller that performs work support for the work machine based on a predetermined and stored work area, an imaging device capable of imaging the appearance of the work machine at the work site, and an input device capable of specifying any position within the image captured by the imaging device, wherein the controller is configured to extract the image area occupied by the work machine from the image captured by the imaging device, based on the number of pixels in the longitudinal direction of the work machine in the extracted image area, the posture information of the work machine, and the actual dimensions of the work machine, convert the position specified in the image by the input device into real space coordinate values, set the work area such that the position of the converted coordinate values becomes an endpoint, store multiple teacher data sets classified by the posture of the work device as teacher data used for extracting the image area occupied by the work machine from the image, and select one teacher data from the multiple teacher data sets based on the current posture information of the work device and use it for extracting the image area.

* * * * *